(12) United States Patent
Karkkainen et al.

(10) Patent No.: US 10,219,097 B1
(45) Date of Patent: Feb. 26, 2019

(54) METHOD AND APPARATUSES FOR IMPLEMENTING A HEAD TRACKING HEADSET

(71) Applicant: Nokia Technologies Oy, Espoo (FI)

(72) Inventors: Asta Maria Karkkainen, Helsinki (FI); Leo Mikko Johannes Karkkainen, Helsinki (FI); Mikko-Ville Laitinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/983,685

(22) Filed: May 18, 2018

(51) Int. Cl.
| | | |
|---|---|---|
| *H04S 7/00* | (2006.01) | |
| *H04S 3/00* | (2006.01) | |
| *H04R 5/033* | (2006.01) | |
| *G06N 3/08* | (2006.01) | |

(52) U.S. Cl.
CPC ............ *H04S 7/304* (2013.01); *G06N 3/08* (2013.01); *H04R 5/033* (2013.01); *H04S 3/008* (2013.01); *H04R 2420/07* (2013.01); *H04S 2400/11* (2013.01); *H04S 2420/01* (2013.01)

(58) Field of Classification Search
CPC .......... H04S 7/303; H04S 7/304; H04S 3/008; H04S 2400/11; H04S 2420/01; H04R 5/033; H04R 2420/07; G06N 3/08
See application file for complete search history.

(56) References Cited

U.S. PATENT DOCUMENTS

| | | | | |
|---|---|---|---|---|
| 2014/0153751 A1* | 6/2014 | Wells | ..................... | H04S 7/304 381/303 |
| 2018/0091924 A1* | 3/2018 | Hammerschmidt | .... | H04S 7/304 |

* cited by examiner

*Primary Examiner* — Jason R Kurr
(74) *Attorney, Agent, or Firm* — Alston & Bird LLP

(57) ABSTRACT

Methods, apparatuses, and computer program products are provided in order to provide 3D audio playback using audio head-mounted devices. The apparatuses may be configured to receive at least one of position and orientation of a first head-mounted device in relation to a first user device, wherein the at least one of the position and orientation received is used to train a model using machine learning. At least one signal quality parameter may be determined based on input data and a filter pair may be determined corresponding with a direction to which a spatial audio signal is rendered based at least in part on the at least one signal quality parameter and the model so as to control spatial audio signal reproduction to take effect a change in the at least one of the position and orientation of the first head-mounted device during rendering of the spatial audio signal.

20 Claims, 7 Drawing Sheets

METHOD AND APPARATUSES FOR IMPLEMENTING A HEAD TRACKING HEADSET

TECHNOLOGICAL FIELD

An example embodiment of the present invention relates generally to audio hands-free devices, such as headsets, and more particularly, to the orientation of audio hands-free devices and three dimensional (3D) audio playback using audio hands-free devices.

BACKGROUND

Users are increasingly using headsets with their mobile devices. Headsets make it possible to provide many applications and usability improvements over hands-free or normal use of mobile devices, such as 3D audio, improved sound quality, improved call quality, improved noise cancellation, navigation with spatial audio, and the like. The main drawback is that when a user wants to listen to 3D audio not all headsets are equipped with inertial sensors including accelerometers, gyroscopes, proximity sensors, and/or optical sensors to detect the head orientation and position of the user wearing the headsets. Determining or tracking the head position and orientation is particularly important when listening to audio with spatial content, like stereo, binaural or multichannel audio or when playing games or following driving instructions with spatialized content or content related to the orientation of the head.

BRIEF SUMMARY

Methods, apparatuses, and computer program product are described herein that are configured to provide 3D audio playback using audio hands-free devices.

For example, the methods, apparatuses, and computer program product may be configured to receive at least one of position and orientation of a first head-mounted device in relation to a first user device, wherein the at least one of the position and orientation received is used to train a model using machine learning. Further embodiments of the methods, apparatuses, and computer program product comprise detecting input data indicative of a change in the at least one of the position and orientation of the first head-mounted device in relation to the first user device; determining at least one signal quality parameter based on the input data, wherein the at least one signal quality parameter is measured between the first head-mounted device and the first user device; and determining a filter pair corresponding with a direction to which a spatial audio signal is rendered based at least in part on the at least one signal quality parameter and the model so as to control spatial audio signal reproduction to effect the change in the at least one of the position and orientation of the first head-mounted device during rendering of the spatial audio signal.

BRIEF DESCRIPTION OF THE DRAWINGS

Figure 1:
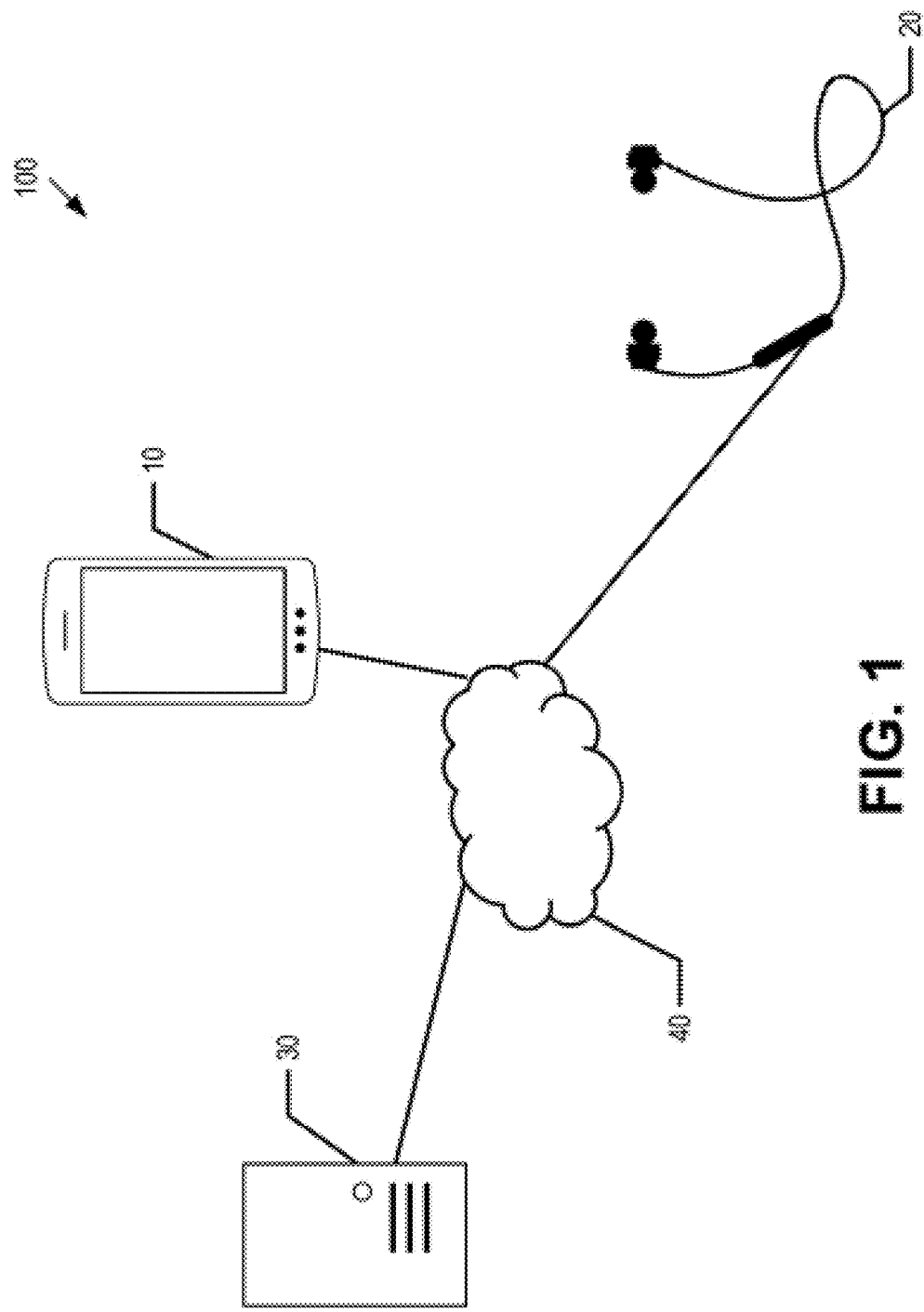
Figure 2:
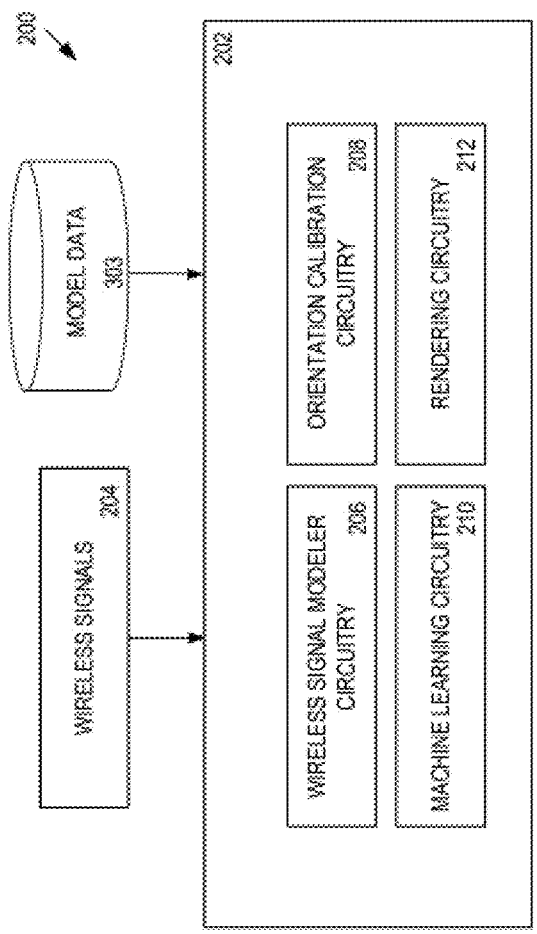
Figure 3:
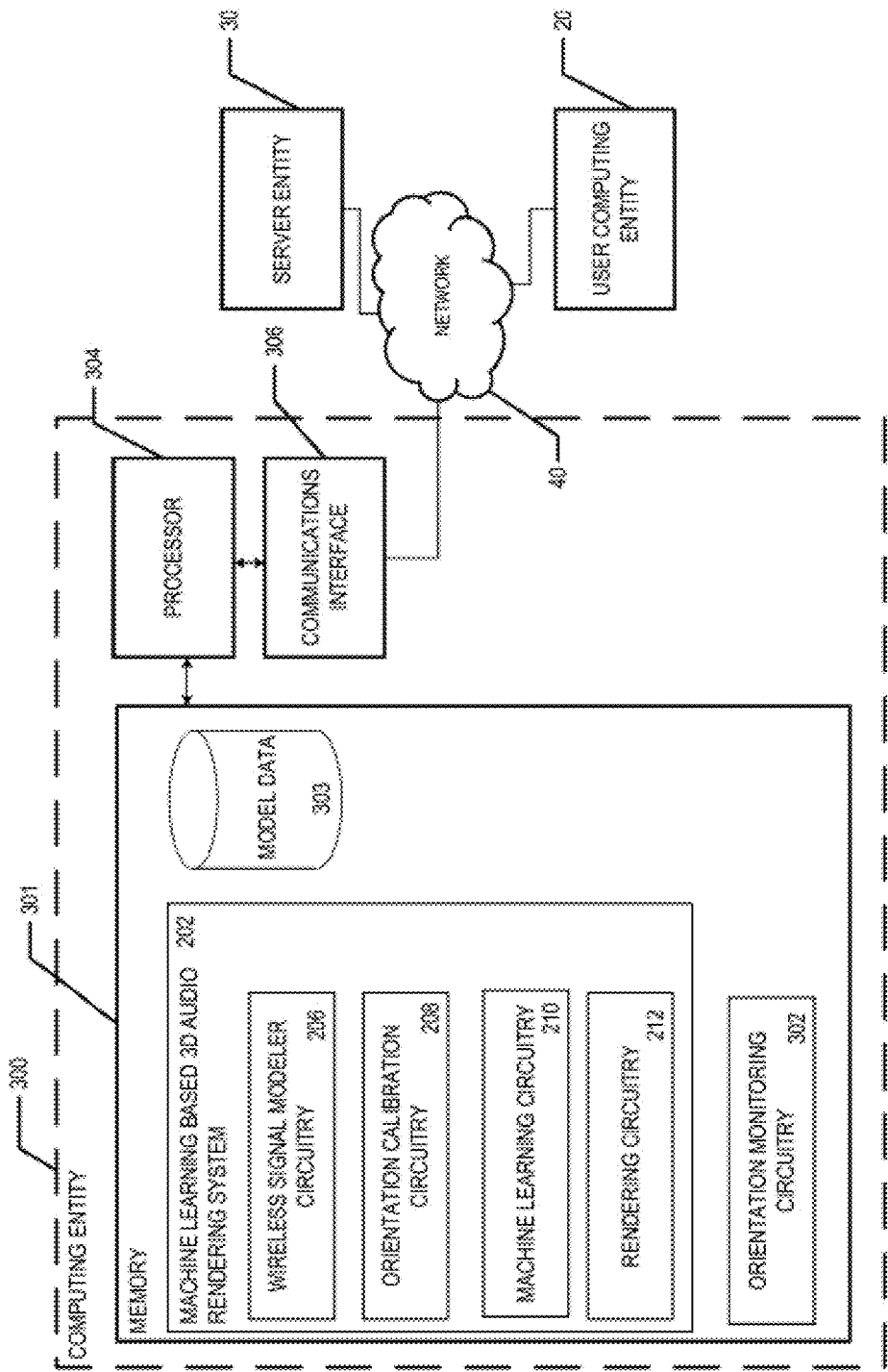
Figure 4A:
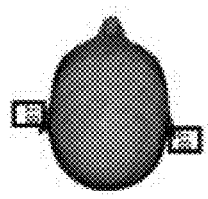
Figure 4A:
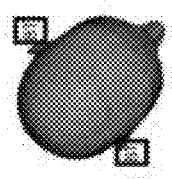
Figure 4A:
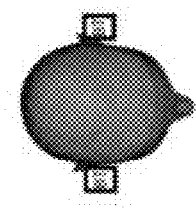
Figure 4B:
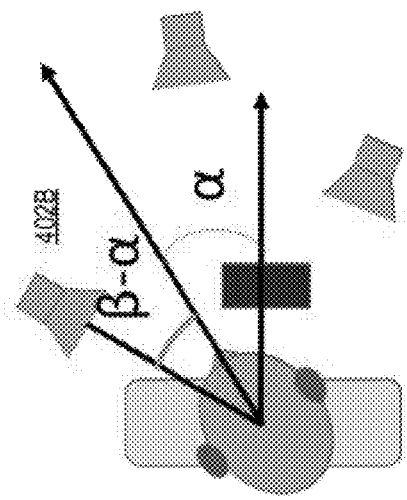
Figure 4B:
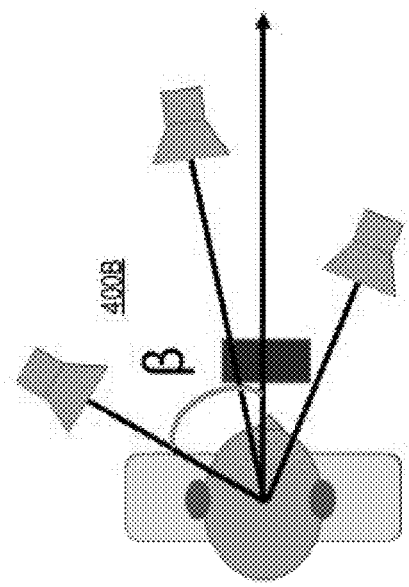
Figure 5:
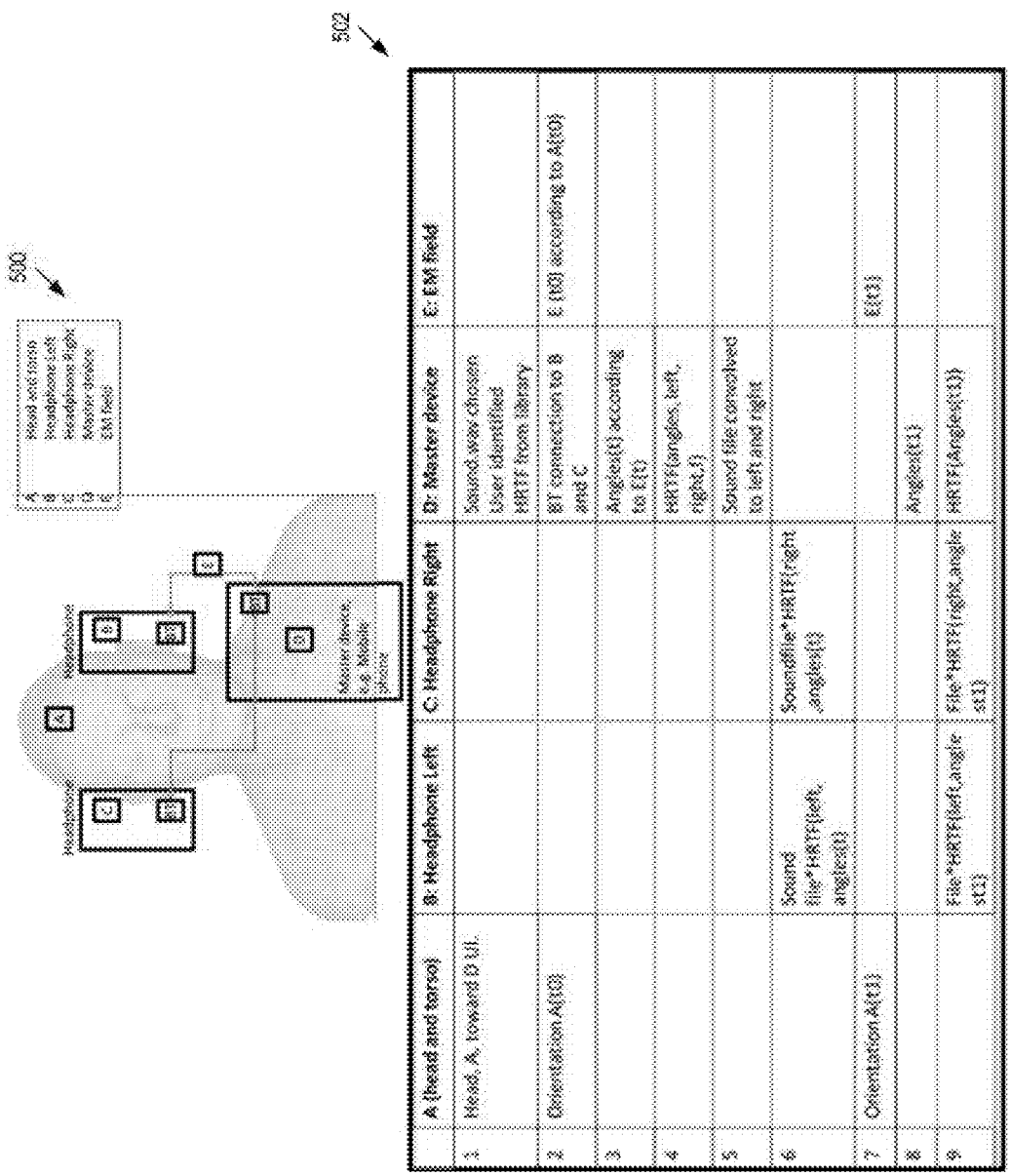
Figure 6:
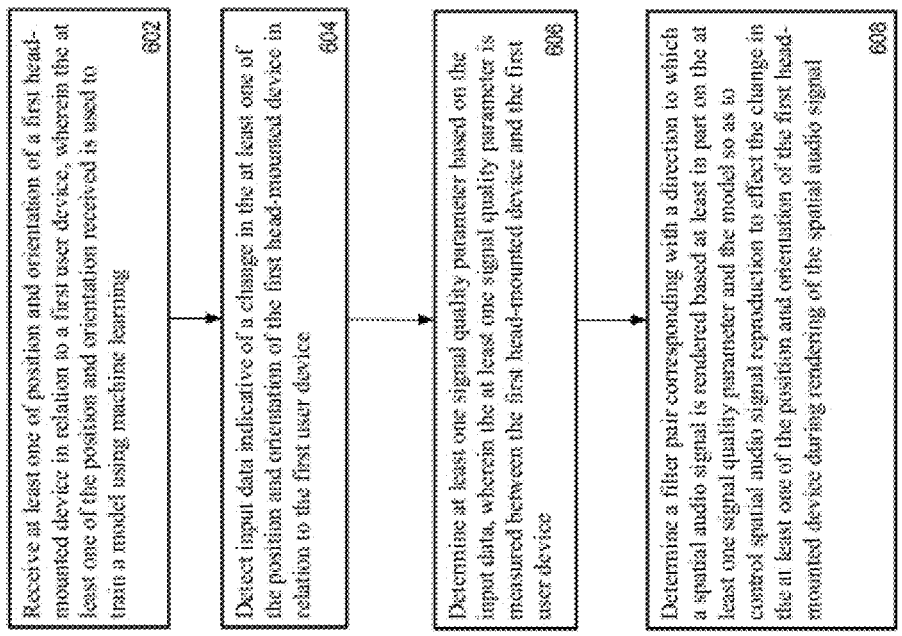
Figure 7:
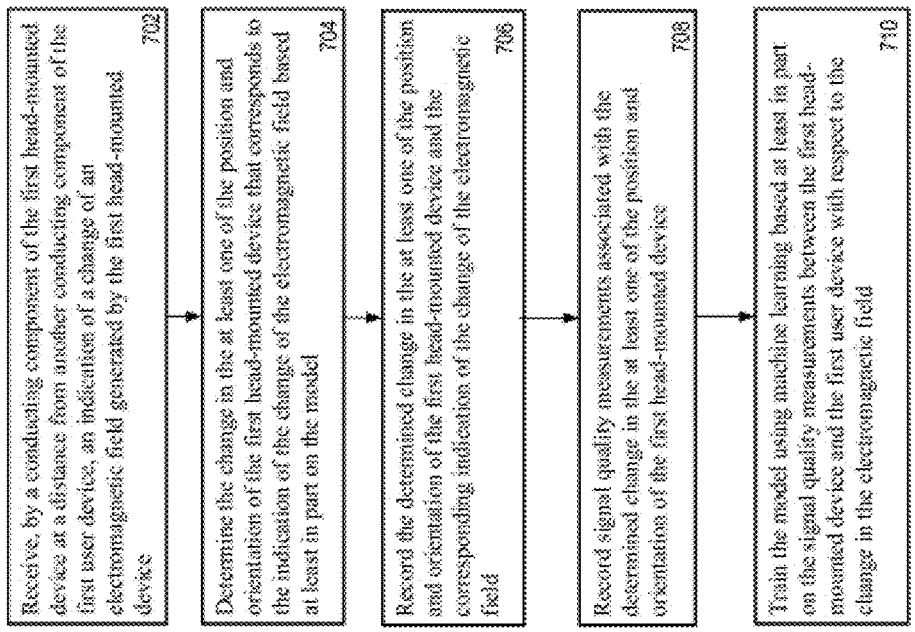

Having thus described certain embodiments of the invention in general terms, reference will now be made to the accompanying drawings, which are not necessarily drawn to scale, and wherein:

FIG. 1 is an overview of a system that can be used to practice an example embodiment of the present invention;

FIG. 2 is a block diagram of example components of an example deep neural network based 3D audio rendering system;

FIG. 3 is a block diagram of an example computing device for practicing certain embodiments of the deep neural network based 3D audio rendering platform service;

FIGS. 4a and 4b illustrate a user wearing headsets in accordance with an example embodiment of the present invention;

FIG. 5 is a table diagram of operations performed in response to detected orientation and position changes in accordance with an example embodiment of the present invention; and FIGS. 6 and 7 are flow charts illustrating operations performed by an apparatus of FIG. 3 that is specifically configured in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

The terms "client device," "first user device," "user device," "master device," "mobile device," refer to computer hardware(s) and/or software(s) that is/are connected via Bluetooth® or other short-range communication technique with a wearable slave device (e.g., headphones). As used herein, the terms "wearable slave device," "slave device," "headphones," "headset," "first head-mounted device," "head-mounted device" and variations thereof may refer to an object that is configured to hold one or more earpieces in close proximity to a user's ear and is/are connected via Bluetooth® or other short-range communication technique with a master device (e.g., mobile device).

A method, apparatus and computer program product are therefore provided according to an example embodiment of the present invention to automatically detect a physical orientation of the head of a user wearing a headset based on changes of wireless signals. Such embodiments remove the need for reliance on specialized sensors that the headset may not be equipped with, and instead may provide for automatically detecting the orientation of the headset so as to provide 3D audio perception.

Detecting the correct orientation is particularly important when a user is listening to audio with spatial content, like stereo, binaural, multichannel audio, audio in Ambisonics representation, or audio objects. A system that automatically detects orientation of the headset would remove the need for specialized headsets equipped with sophisticated sensors. This may be particularly useful when a user only has headsets equipped with a Bluetooth® transmitter.

Headsets are increasingly equipped with a short-range transmitter (e.g. a Bluetooth® transmitter) paired to a Bluetooth® transceiver in a mobile device. Signals received by a mobile device from the headset over a short-range wireless connection may be used for the additional purposes of determining the orientation of the user wearing the headset.

In one example embodiment, signal quality parameters of networks for example, the signal-to-noise ratio (SNR) and the bit error ratio (BER) may be used to determine the orientation of the headset (and the user). Such signal quality parameters may be used as input to a rules-based system or deep learning neural network to determine the estimated orientation.

In another example embodiment, the electromagnetic field from the headsets to the mobile device is used to determine the position and orientation of the headsets by utilizing electromagnetic signaling in conjunction with a calibration process.

I. System Architecture

FIG. 1 provides an illustration of the components involved in an example embodiment of the present invention. FIG. 1 shows system 100 including an example network architecture for a system, which may include one or more devices and sub-systems that are configured to implement some embodiments discussed herein. For example, the system 100 may include a machine learning based 3D audio rendering (MLB3DAR) system 30, which can include, for example, a server or database, among other things (not shown). The MLB3DAR system 30 may include any suitable network server and/or other type of processing device. In some embodiments, the MLB3DAR system 30 may determine and transmit commands and instructions for training Bluetooth® orientation models and determining a directional transfer function pair to control spatial audio signal reproduction using wireless signal data stored via a model data database 303 (shown in FIG. 3) which may be stored as a part of and/or in communication with one or more client devices 10 and/or the MLB3DAR system 30. The model data database 303 includes information accessed and stored by the client device 10 to facilitate the operations of the rendering system (shown in FIG. 2).

As shown in FIG. 1, the MLB3DAR system 30 can communicate with one or more client devices 10 and/or other computing entities via communications network 40. In this regard, communications network 40 may include any wired or wireless communication network including, for example, a wired or wireless local area network (LAN), personal area network (PAN), metropolitan area network (MAN), wide area network (WAN), or the like, as well as any hardware, software and/or firmware required to implement the network (such as, e.g., network routers, etc.). For example, communications network 40 may include a cellular telephone, an 802.11, 802.16, 802.20, and/or WiMax network. Further, the communications network 40 may include a public network, such as the Internet, a private network, such as an intranet, or combinations thereof, and may utilize a variety of networking protocols now available or later developed including, but not limited to Transmission Control Protocol (TCP) and the Internet Protocol (IP) based networking protocols. For instance, the networking protocol may be customized to suit the needs of the group-based communication interface. In some embodiments, the protocol is a custom protocol of JavaScript Object Notation (JSON) objects sent via a Websocket channel. In some embodiments, the protocol is JSON over remote procedure call (RPC), JSON over Representational State Transfer (REST)/Hypertext Transfer Protocol (HTTP), and the like.

Client devices 10 and/or MLB3DAR system 30 may each be implemented as one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicular entertainment, information, navigation, or other systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The depiction in FIG. 1 of a single client device is merely for illustration purposes. Any number of users and/or client devices 10 may be included in the system for accessing and/or implementing aspects of the MLB3DAR system 30 and rendering system discussed herein (e.g., via one or more interfaces). In one embodiment, the client devices 10 may be configured to display or provide an audio rendering interface on a display of the client device for viewing, creating, editing, and/or otherwise interacting with spatial audio signal reproduction, which may be provided by the MLB3DAR system 30 (and may be stored locally at one or more client devices 10). According to some embodiments, the MLB3DAR system 30 may be configured to cause display or presentation of an interface for viewing, creating, editing, and/or otherwise controlling spatial audio signal reproduction.

In some embodiments, the MLB3DAR system 30 may be configured to be in communication with the one or more client devices 10 to establish a cloud-based, device-based, and/or or fog-based 3D audio rendering system for a user. Moreover, the MLB3DAR system 30 may further offer a hybrid architecture to enable opt-in community-based feedback, transfer learning of head positions and orientations.

As indicated above, the client devices 10 may be any computing device as defined above. Electronic data received by the MLB3DAR system 30 from the client devices 10 may be provided in various forms and via various methods. For example, the client devices 10 may include desktop computers, laptop computers, smartphones, netbooks, tablet computers, wearables, and the like. In embodiments where a client device 10 is a mobile device, such as a smart phone or tablet, the client device 10 may execute an application (app) such as a head tracking and 3D audio rendering application to interact with the MLB3DAR system 30. Such apps are typically designed to execute on mobile devices, such as tablets or smartphones. For example, an app may be provided that executes on mobile device operating systems such as iOS®, Android®, or Windows® operating systems. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client device 10 may include various hardware or firmware designed to interface with the MLB3DAR system 30.

As shown in FIG. 1, one or more head-mounted devices 20 (which in certain embodiments may be part of one or more client devices 10) provide position and orientation movement information to the MLB3DAR system 30. The one or more head-mounted devices 20 may be a Bluetooth®-enabled headset or earpiece. As shown by way of example in FIG. 1, the one or more client devices 10 include a short-range receiver (e.g. a Bluetooth® receiver). The one or more head-mounted devices 20 include, in this example, at least one short-range transmitter (e.g. a Bluetooth® transmitter) located in either the left or right earpiece.

The one or more head-mounted devices 20 may also support other short-range wireless communication techniques, in addition to Bluetooth® communication. Other short-range wireless communications technologies may include, but is not limited to, a wireless Local Area Network (LAN) which could be a Wi-Fi, Bluetooth®, WiFi direct (WFD), Near Field Communication (NFC), Ultra WideBand (UWB), Infrared Data Association (IrDA) network, or ZigBee®.

Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

II. Machine Learning Based 3D Audio Rendering (MLB3DAR) System

MLB3DAR system 30 can be configured to analyze existing Bluetooth® orientation models derived from the existing head-mounted device population which most-nearly matches one or more model characteristics of the one or more head-mounted devices 20. In certain embodiments, the MLB3DAR system 30 may be embodied as a server and/or any other computing entity having one or more components as discussed above in reference to client devices 10. Moreover, the MLB3DAR system 30 may be in communication (e.g., via communications network 40) with one or more client devices 10 to provide an initial calibration model/strategy for use via the rendering system, to provide various wireless signal data usable via the head tracking and 3D audio rendering application, and/or the like. As discussed herein, the MLB3DAR system 30 may be configured to repeatedly or continuously update one or more stored Bluetooth® orientation models, and accordingly the MLB3DAR system 30 may be configured to receive wireless signal data from the one or more head-mounted devices 20 relative to the one or more client devices 10, and to store such wireless signal data in a memory storage area similar to and/or embodied as a model data database 303 stored in association with the MLB3DAR system 30.

In some embodiments, with reference to FIG. 2, the MLB3DAR system 30 may include a wireless signal modeler circuitry 206, an orientation calibration circuitry 208, a machine learning circuitry 210, and a rendering circuitry 212. In some example embodiments, the environment 200 further comprises one or more wireless signals 204 and model data database 303. The wireless signal modeler circuitry 206, orientation calibration circuitry 208, machine learning circuitry 210, and rendering circuitry 212 make take the form of, for example, a code module, a component, circuitry or the like. The components of the environment 200 are configured to provide various logic (e.g. code, instructions, functions, routines and/or the like) and/or services related to estimating and tracking position and orientation of the one or more head-mounted devices 20 relative to the one or more client devices 10 using an advanced rule-based system or machine learning modeling of known orientation arrangements in a plurality of head-mounted devices.

The MLB3DAR system 30 may receive a plurality of wireless signals 204 from at least one Bluetooth® transmitter of the one or more head-mounted devices 20, which may be acquired as a result of calibrating the one or more head-mounted devices 20 relative to the one or more client devices 10. In some embodiments, the MLB3DAR system 30 may execute position and orientation determination using the orientation calibration circuitry 208, process the data in the machine learning circuitry 210, predict the position and orientation movement of the one or more head-mounted devices 20, and output a directional transfer function such as a head-related transfer function (HRTF) pair or a filter pair producing inter-aural level and/or time differences corresponding with a target direction to which a spatial audio signal is rendered based at least in part on the wireless signals 204 and the model data 303 so as to control spatial audio signal reproduction to effect a change in the position and orientation of the one or more head-mounted devices 20 during reproduction of the spatial audio signal.

The MLB3DAR system 30 is configured to use a large data set of measured head positions and orientations, as well as corresponding Bluetooth® signal transmission features with corresponding reception values with multiple client device locations. The MLB3DAR system 30 using the machine learning circuitry 210 is configured to predict the head position and orientation from those Bluetooth® signal reception features. All features will be included in the training model using the wireless signal modeller circuitry 206.

After the model is trained using the wireless signal modeller circuitry 206 and machine learning circuitry 210, the model is used as a template as follows: i) when a user is calibrating their head-mounted device, the extra data is collected and used to train the model to the current situation; and ii) the model update may happen locally on the client device or may be transmitted to the MLB3DAR system 30 for updates.

In some embodiments, the plurality of wireless signals 204 may include a combination of Bluetooth® signals, received signal strength (RSS) parameters, bit error rate (BER) parameters, signal-to-noise ratio (SNR) parameters, measureable features of electromagnetic waves, as well as other measurable features of the electromagnetic field itself between the one or more head-mounted devices 20 relative to the one or more client devices 10.

The wireless signal modeler circuitry 206 using the machine learning circuitry 210 estimates the position and orientation movement of the one or more head-mounted devices 20 relative to the one or more client devices 10 via one or more artificial intelligence and/or machine learning algorithms via the machine learning circuitry 210. In certain embodiments, the machine learning circuitry 210 may be generated at the MLB3DAR system 30, and provided to one or more client devices 10 for execution and/or updating. The artificial intelligence engine may provide a plurality of algorithms, which may utilize a discriminative approach, and/or other approaches for providing training data to the artificial intelligence algorithm. For example, a discriminative approach may comprise building a discriminative model to predict the position and orientation movement of the one or more head-mounted devices 20 relative to the one or more client devices 10 given a plurality of measured head positions/orientations and corresponding Bluetooth® signal transmission features with corresponding reception values at multiple positions and locations. Examples of how a discriminative model can be generated include Logistic Regression, Random Forests, Extreme Gradient Boosting and Deep Neural Networks.

The MLB3DAR system 30 is configured to receive the wireless signals 204 from the one or more client devices 10 and determine whether a property of the received signal (for example signal to noise ratio (SNR), received signal strength (RSS), bit error rate (BER), signal-to-noise ratio (SNR), and measureable features of electromagnetic waves) exceeds a threshold level of the Bluetooth® orientation model. Based on this determination, the MLB3DAR system 30 and/or rendering circuitry 212 determines a directional transfer function pair corresponding with a target direction to which a spatial audio signal is rendered based at least in part on the at least one signal quality property and the model so as to control spatial audio signal reproduction to take any change in the position and orientation of the one or more head-mounted devices 20 during reproduction of the spatial audio signal.

In some example embodiments, the wireless signal modeler circuitry 206 is configured to use wireless signals 204 and model data database 303 to determine an estimated orientation. At least one purpose of the wireless signal modeler circuitry 206 is to gather all wireless signal data from a plurality of different head-mounted devices. After aggregating and collecting the data, the model data database 303 models the wireless signal data into a pattern that associates wireless signals and known head orientations. In an embodiment, model data database 303 stores model data for generating and training patterns, and computer-usable information output by the wireless signal modeler circuitry 206.

The model data database 303 may include one or more reference parameter values associated with determining the position and orientation of the one or more head-mounted devices 20 in relation to the one or more client devices 10. For example the model data database 303 may include a reference wireless signal strength to which the position and orientation of the one or more head-mounted devices 20 in relation to the one or more client devices 10 may be compared. The reference wireless signal strength may be associated with a class of Bluetooth® devices and may be indicative of an empirical relationship between relative position/orientation and wireless signal strength of that Bluetooth® class.

In some example embodiments the orientation calibration circuitry 208 is configured to use the large data set comprising measured head positions and orientations and corresponding Bluetooth® signal transmission features with corresponding reception values from a plurality of head-mounted devices, also known as slave devices, wherein the plurality of slave devices are configured to send signals to at least one client device, also known as the master device. An initial, calibration phase to establish a relationship between the slave device and master device may be required before tracking movement. For example, the calibration circuitry 208 is configured to initiate the calibration process by generating for display by the master device instructions to the user to calibrate the slave device. Calibration involves the slave device being secured on the user's head and the user moving their head in various positions in proximity to the master device (e.g., positions 45 degrees to the right and to the left, positions 45 degrees up and down) while the orientation monitoring circuitry 302 (shown in FIG. 3) acquires data for the slave device relative to the master device in each of the positions. The MLB3DAR system 30 is configured to use the data to calculate a relationship between the slave device and the master device and the corresponding combination of Bluetooth® signals, received signal strength (RSS) parameters, bit error rate (BER) parameters, signal-to-noise ratio (SNR) parameters, measureable features of electromagnetic waves, and/or other measurable features of the electromagnetic field itself between the slave device and master device. As the user changes position and orientation, the MLB3DAR system 30 is configured to track and determine a position and orientation of the slave device based on the known relationship of slave and master devices, the received wireless signal data determined during calibration, and known data from trained Bluetooth® orientation models.

The calibration circuitry 208 is also configured to record head positions of the one or more head-mounted devices 20 as a function of the received wireless signals. In some example embodiments, the master device comprises a Bluetooth® receiver and controller adapted to communicate with the headset using the Bluetooth® standard. The master device as described in detail below is configured to determine positions/orientations of the one or more slave devices relative to the master device.

With the machine learning circuitry 210 configured to provide models for predicting the head position and orientation of the one or more head-mounted devices 20 from the wireless signal reception features, various machine learning/artificial intelligence learning techniques may be utilized to train the model to optimize future tracking and head position and orientation predicting. As just one example, learning can be applied to determine an optimal tracking model to maximize the likelihood of successfully predicting head positions of the one or more head-mounted devices 20.

The rendering circuitry 212 may then spatially filter each of the input audio signals according to the predicted position and orientation of the one or more head-mounted devices 20 and a target position for each of the input audio signals. A target position for each of the input audio signals is a direction to which each of the audio signals should be rendered to provide spatially filtered output audio signals for playback for the at least one device. In other words, each audio signal may have its own target position. In some embodiments, the rendering circuitry 212 is configured to implement such sound reproduction by filtering the input audio signals with head-related transfer functions (HRTF) that correspond to the target/desired directions of the input signals after the head position and orientation of the one or more head-mounted devices 20 has been taken into account. In HRTFs, there is one filter for each ear. Additionally or alternatively, in the case of multiple input audio signals, each audio signal is filtered with a corresponding HRTF pair and the resulting signals may be summed resulting in one audio signal for the left ear and one audio signal for the right ear. Additionally or alternatively, the rendering circuitry 212 may be configured to implement any other suitable method to spatialize the input audio signals for playback.

In yet another example embodiment, multiple speakers are distributed within the one or more head-mounted devices 20 in order to render audio events at specific locations relative to the user's head position and orientation. In some embodiments, audio signal processing techniques may be used to virtually render audio events at specific locations within the sound space using the multiple speakers.

II. Computing Entity

The system of an embodiment of the present invention may include a computing entity 300 as generally described below in conjunction with FIG. 3 for performing one or more of the operations set forth by FIGS. 5 and 6 and also described below. In this regard, the computing entity 300 or apparatus may be embodied by the one or more client devices 10, a server and/or any other computing entity.

It should also be noted that while FIG. 3 illustrates one example of a configuration of a computing entity 300 for providing a mobile device, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 3, a computing device 300, apparatus, or master device for providing orientation tracking of at least one headset device or slave device in accordance with one example embodiment may include or otherwise be in communication with one or more processing circuitry 304, a memory 301, a communications interface 306, and an orientation monitoring circuitry 302.

In some embodiments, the processing element (and/or co-processors or any other processing circuitry assisting or otherwise associated with the processor) may be in communication with the memory 301 via a bus for passing information among components of the apparatus. The memory device 301 may include, for example, a non-transitory memory, such as one or more volatile and/or non-volatile memories. In other words, for example, the memory 301 may be an electronic storage device (e.g., a computer readable storage medium) comprising gates configured to store data (e.g., bits) that may be retrievable by a machine (e.g., a computing device like the processor). The memory 301 may be configured to store information, data, content, applications, instructions, or the like for enabling the apparatus to carry out various functions in accordance with an example embodiment of the present invention. For example, the memory 301 could be configured to buffer input data for processing by the processing element 304. Additionally or alternatively, the memory 301 could be configured to store instructions for execution by the processor.

Memory 301 may further encompass one or more aspects of the model data database 303, an orientation monitoring circuitry 302, and the MLB3DAR system 30 as discussed in greater detail herein (however the model data database 303 may be stored in association with the MLB3DAR system 30 in certain embodiments). As discussed herein, the head tracking and 3D audio rendering application may be associated with and/or provided by a user equipped with a head-mounted device to control spatial audio signal reproduction to effect any change in the position and orientation of the head-mounted device during reproduction of spatial audio signal, via the MLB3DAR system 30.

In some embodiments, the apparatus or computing entity 300 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor or processing element 304 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor or processing element 304 may be configured to execute instructions stored in the memory 301 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus or computing entity 300 may optionally include a user interface that may, in turn, be in communication with the processor or processing element 304 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 301, and/or the like).

Meanwhile, the communication interface 306 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some example embodiments, the apparatus 300 may also include an orientation monitoring circuitry 302 configured to detect changes in position, motion and/or orientation of the one or more head-mounted devices 20 based on the wireless signals. The orientation monitoring circuitry 302 is configured to detect current wireless signal strength information between the slave device and the master device and may repeatedly or continuously track the wireless signal strength. The wireless signal strength information may then be provided to the MLB3DAR system 30 for further processing. In some example embodiments, the wireless signal strength information supplied by the orientation monitoring circuitry 302 may be compared with the pre-trained data values stored at the model data database 303.

In some example embodiments, the model data database 303 and/or MLB3DAR system 30 may be in communication with the one or more client devices 10 and may be configured to perform the functionality discussed herein related to head tracking and 3D audio rendering. In some embodiments, some or all of the functionality of head tracking and 3D audio rendering may be performed by processing element 304. In this regard, the example processes and algorithms discussed herein can be performed by at least one processing element 304, model data database 303, and/or MLB3DAR system 30.

II. System Operation—Position and Orientation Tracking

FIG. 4a illustrates a depiction of a user wearing a headset paired with a master device equipped with orientation tracking module according to such an example embodiment. FIG. 4a illustrates views of a user wearing a headset from the top, with boundary conditions for the electromagnetic changes as the orientation of the head changes. In the example embodiment, when the wireless signals from left and right ears are alike, the orientation of the head is symmetric and this information may be used in conjunction with the quality of the wireless signals in determining the orientation of the one or more head-mounted devices 20.

FIG. 4b illustrates 3D audio playback using a headset. As shown in FIG. 5a, in order to keep the illusion of fixed positions of the loudspeakers the MLB3DAR system 30 is configured to adjust the directions of the sound sources according to the orientation of the head. For example, the direction of the top loudspeaker (angle β between the speaker direction and the direction of the listener's nose 500A) must be changed to correspond with the change of direction (angle=β−α 500B), when the head rotates from angle=0, to angle=α. In some embodiments, the MLB3DAR system 30 is configured to use a filter pair such as a head-related transfer function (HRTF) pair in order to filter sound to be heard from a desired direction. The perception of the sound scene is better if the positions of the sound sources do not rotate as the head rotates and fixing the perceived positions of the sound sources requires information of the orientation of the head which is achieved and described in further detail below.

FIG. 5 illustrates the importance of the human body as it has an effect on the electromagnetic field (e.g., Bluetooth® or any other connection based on the electromagnetic field). As shown in FIG. 5, the human body or any other object (that has an effect to the electromagnetic field) may add an additional boundary condition to the system of transmitters and receivers of the one or more head-mounted devices 20 and the one or more client devices 10. For example, shown in FIG. 5 is an example table of operations occurring in each of A) head and torso, B) headphone left, C) headphone right, D) master device, and E) electromagnetic (EM) field at times t=1, . . . , 9. Moving from left to right and down the table, cell A1 describes a user having head A looking towards master device D. In the same row and as shown in cell D1, the master device indicates a sound .wav file identified by the user as well as the desire to use a HRTF pair in order to filter sound to be heard from a desired direction. Moving to row 2, cell A2 indicates the orientation of the head A at a timestamp t0. Within the same row, the MLB3DAR system 30 is configured to measure the wireless signal (e.g., Bluetooth signal connection) from the master device to headphone B and headphone C as well as to measure the electromagnetic field at timestamp t0 according to the orientation of the head A(t0). As shown in cells D3 and D4, the MLB3DAR system 30 is configured to adjust angles between the sound source direction and the electromagnetic field as well as use a head-related transfer function (HRTF) pair or a filter pair to facilitate fixing the perceived positions of sound sources to be heard from a desired direction. In cell D5, the MLB3DAR system 30 is configured to convolve sound signals of the sound file to the right and left ears using HRTFs for chosen directions as shown in cells 6B and 6C. Cells 6B and 6C show spatial audio signals (using HRTFs and head tracking) on left and right headphones, respectively. In some embodiments, the MLB3DAR system 30 is configured to use Nokia's OZO® system which captures in real-time video with a horizontal, 360 degree field-of-view and in the vertical plane, a 360 degree field-of-view may be captured to create a complete spherical world, or alternatively, a more limited angle may be used. In some embodiments, once the entire spatial field (360 degrees) or a predetermined proportion of the spatial field (e.g., 180 degrees) has been viewed, and the present audio sources faded-in, then the spatial audio, e.g. captured by an OZO device, may also be faded in by the MLB3DAR system 30. Accordingly, HRTFs and head tracking are initialized to provide 3D audio sound to the listener. As shown in cell A7, the MLB3DAR system 30 is configured to detect a change in orientation A at timestamp t1 in which the electromagnetic field at E(t1) and the Bluetooth® signals are captured and measured as shown in cells E7 and D8. At the same time, at least one signal quality parameter x is measured to make a relation y=f(x), using machine learning and the pre-trained models, between the two signals x and y. Machine learning takes input x and provides a trained function f to produce the inference y=f(x). This step measures the signal y for model training. Using the learned relation y=f(x), the MLB3DAR system 30 is configured to produce the inference result y (e.g., the head position and orientation). Thereafter and as shown in cells B9, C9, and D10, the inferred orientation value y is used for rendering the 3D audio scene, that takes into account the head tracking movements.

The remaining cells shown in the table of FIG. 5 describe the operations of changing the angles of the sound directions according to the orientation of the head/body and convolving sound signals to right and left ears using HRTFs for chosen directions.

FIG. 6 illustrates a flowchart of operations, which may be performed by an apparatus/computing entity, such as apparatus/computing entity 300, to determine headset position and orientation of one or more head-mounted devices 20 according to one example embodiment. Operations for determining the headset position and orientation may start at block 602 where the apparatus 300 includes means, such as the communications interface 306, the processor 304, or the like, for receiving at least one of position and orientation of a first head-mounted device in relation to a first user device, wherein the at least one of the position and orientation received is used to train a model using machine learning. In some example embodiments, the apparatus is a master device comprising a Bluetooth® receiver and controller adapted to communicate with local headset devices using the Bluetooth® standard. The apparatus 300 is configured to determine positions of one or more head-mounted devices in relation to a user device, wherein the apparatus 300 is configured to assess the wireless signals between the one or more head-mounted devices and the user device at a plurality of orientations, thereby enabling a determination of the relative orientation of the one or more head-mounted devices based on the wireless signal strengths at different orientations.

In certain embodiments, the apparatus 300 is configured to measure the head orientation by some at least one of the following methods: asking users to move their head in a given way, or capturing, via a camera and/or video, sitting users to measure their movement, or and other similar means. The data captures is then used to train the machine learning models.

Tha machine learning model then takes the input data x and provides a trained function f to produce the inference y=f(x). This step measures the signal y for the training. The machine learning, also known as transfer learning, will be started from pre-trained models stored in model data database 303, according to the make or type of Bluetooth® device in question. The user may be also asked by the apparatus 300 to select a model that seems to perform best, or the model may be automatically selected by apparatus 300 from handshaking data produced, when the devices (headset and mobile device) are coupled.

In this regard, the apparatus 300 may include means, such as the processor/processing element 304, or the like, for detecting input data indicative of a change in the at least one of the position and orientation of the first head-mounted device in relation to the first user device. See block 604 of FIG. 6. At the same time, the apparatus 300 is configured to measure the Bluetooth® wireless, antenna signals (or at least one signal quality parameter x) to make a relation y=f(x), using machine learning, between the two signals x and y. The apparatus 300 is, after training, or with already pre-trained models, configured to detect the head movement with respect to the first user device.

As shown in block 606, the apparatus 300 may further include means, such as the processor/processing element 304, or the like, for determining at least one signal quality parameter based on the input data, wherein the at least one signal quality parameter is measured between the first head-mounted device and the first user device. Parameters or measures indicative of the signal quality at the receiving end, master/user device are, for example, Bluetooth® signals, received signal strength (RSS), bit error rate (BER), signal-to-noise ratio (SNR), and/or measureable features of electromagnetic waves. By determining the properties and/or noise levels of these parameters, an indication of the signal quality at the receiving end/master end can be obtained. The apparatus 300 is further configured to include means, such as the processor 304 or the like, for using the learned relation y=f(x) to produce the inference result y (the head position). This is after the training steps as described above have been performed. Also, a pre-trained model can be used, and trained further with the data acquired. The apparatus 300, such as the processor 304 or the user, via the apparatus 300, can also initiate a new training session to improve the quality. The inferred orientation value y is used for rendering the dynamic 3D audio scene, and takes into account the head movements as described below.

Once the apparatus 300 determines the signal quality measurements of the received wireless signals, operation may continue to block 608 where the apparatus includes means, such as the processor 304 or the like for determining a filter pair corresponding with a direction to which a spatial audio signal is rendered based at least in part on the at least one signal quality parameter and the model so as to control spatial audio signal reproduction to effect the change in the at least one of the position and orientation of the first head-mounted device during rendering of the spatial audio signal. The first pair is configured to provide directionality and comprises a directional transfer function pair for a corresponding direction. The directional transfer function pair is a head-related transfer function (HRTF) pair or a filter pair producing inter-aural level differences (ILD) and/or inter-aural time differences (ITD). The direction can be both automatic (e.g., for 5.1 signals the directions would, at least normally, be known), or it could be semi-automatic (apparatus 300 is configured to edit the automatic positions), or manual (e.g., apparatus 300 is configured to position the music to a certain direction). Additionally or alternatively, apparatus 300, such as processor 304 or the like may be configured to execute many kinds of applications that position the audio automatically to certain directions.

The apparatus 300 such as the processor 304 or the like utilizes a discriminative approach comprising at least one of Deep Neural Networks, Logistic Regression, Random Forests, or Extreme Gradient Boosting trained directly on the orientation data from the plurality of slave devices that may require calibration before tracking the orientation of the slave device to learn orientation patterns based on the received wireless signals. Certain embodiments of the present invention provide computationally efficient methods for utilizing machine learning/artificial intelligence for orientation detection and tracking.

The apparatus 300 may include means, such as the processor/processing element 304, memory 301, MLB3DAR system 30, or the like, for determining, based on the pattern, an estimated orientation of the at least one slave device that most likely generates the accessed signal quality measurements. The apparatus 300 may include means, such as the processor/processing element 304, memory 301, MLB3DAR system 30, or the like, for computing the likelihood that each of the known orientation arrangements in the plurality of head-mounted/slave devices produces the assessed signal quality measurements using probability density functions of the trained model.

The apparatus 300 may include means, such as the processor/processing element 304, memory 301, MLB3DAR system 30, or the like, for spatially filtering audio signals based on the estimated orientation to provide spatially filtered output audio signals for playback by the at least one device. In some embodiments, the apparatus 300 may include means, such as the processor/processing element 304, memory 301, orientation monitoring circuitry 302, or the like, for tracking the location and/or orientation of the at least one head-mounted/slave device within the environment. In such embodiments, the location and/or orientation may be used by the rendering circuitry 212 to maintain the positions of audio events relative to the at least one slave device's environment. For example, and without limitation, when the user of the at least one slave device turns his or her head towards an audio event that is initially located on one side of the sound space, the rendering circuitry 212, the orientation monitoring module, or the like are configured to track the change in orientation of the user's head relative to the environment and, in response, modify spatial audio parameters associated with the audio event so that the audio event is repositioned accordingly (e.g., in front of the user).

FIG. 7 illustrates a flowchart of operations, which may be performed by an apparatus, such as apparatus 300, to record signal quality measurements between the master device and the at least one slave device according to one example embodiment. Operation may start at block 702 in which the apparatus 300 includes means, such as the communications interface 306, the processor 304, or the like for receiving, by a conducting component of the first head-mounted device at a distance from another conducting component of the first user device, an indication of a change of an electromagnetic field generated by the first head-mounted device. In this example, the conducting component of the first head-mounted device is an antenna having a conductive element and the conducting component of the first user device is an antenna having a conductive element. The at least one slave device may include a first conducting component configured to be disposed on or around a portion of the user's head. The first conducting component may be configured to generate an electromagnetic field in response to a receipt of a Bluetooth® signal from the first user device/master device.

In this regard, the apparatus 300 may include means, such as the processor/processing element 304, or the like, for determining the change in the at least one of the position and orientation of the first head-mounted device that corresponds to the indication of the change of the electromagnetic field based at least in part on the model. See block 704 of FIG. 7. The change in the electromagnetic field may be caused by a change of orientation of the user's head, for example. More specifically, the electromagnetic field may induce voltage in another second conducting component of the master device. The induced voltage may change over time according to the change of the electromagnetic field, such as in response to the change of the orientation of the user's head.

The apparatus 300 may include means, such as the processor/processing element 304, memory 301, orientation calibration circuitry 208, or the like, for recording the determined change in the at least one of the position and orientation of the first head-mounted device and the corresponding indication of the change of the electromagnetic field. See block 706 of FIG. 7.

As shown in block 708 of FIG. 7, the apparatus 300 may also include means, such as the processor/processing element 304, memory 301, orientation calibration circuitry 208, or the like, for recording signal quality measurements associated with the determined change in the at least one of the position and orientation of the first head-mounted device.

As shown in block 710 of FIG. 7, the apparatus 100 may also include means, such as the processor/processing element 304, memory 301, orientation calibration circuitry 208, or the like for training the model using machine learning based at least in part on the signal quality measurements between the first head-mounted device and the first user device with respect to the change in the electromagnetic field.

In some example embodiments, spatially filtering audio signals based on the estimated orientation to provide spatially filtered output audio signals comprises processing the audio signals with a head related transfer function with the estimated orientation as a parameter input for the head related transfer function.

As noted above, not all headsets are equipped with inertial sensors including accelerometers, gyroscopes, proximity sensors, and/or optical sensors to detect the head orientation and position of the user wearing the headsets. An example embodiment described herein provides for turning a Bluetooth® headset to a head tracking device. A master device (e.g., mobile device) is connected via Bluetooth® with a wearable slave device (e.g., headphones). Bluetooth® wireless signals are transferred from slave to master. An example embodiment discussed herein detects an orientation of a user's head wearing the wearable slave device based on changes of the Bluetooth® wireless signals. The position, direction, and/or orientation of the head is estimated by comparing received Bluetooth® wireless signals with a model. The estimated position, direction, and/or orientation of the head is then used as input to spatial audio parameters to change angles of the sound directions according to the estimated position, direction, and/or orientation of the head. Moreover, the model is a model of Bluetooth® wireless signals as a function of the orientation of the head using machine learning. In this fashion, example embodiments ensure a headset is able to facilitate 3D audio sound without using inertial sensors, accelerometers, gyroscopes, proximity sensors, optical sensors, or the like.

As described above, FIGS. 5 and 6 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 301 of an apparatus employing an embodiment of the present invention and executed by a processor/processing element 304 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer code for one or more programs, the at least one memory and the computer code configured to with the at least one processor cause the apparatus to:

receive at least one of position and orientation of a first head-mounted device in relation to a first user device, wherein the at least one of the position and orientation received is used to train a model using machine learning;

detect input data indicative of a change in the at least one of the position and orientation of the first head-mounted device in relation to the first user device;

determine at least one signal quality parameter based on the input data, wherein the at least one signal quality parameter is measured between the first head-mounted device and the first user device; and determine a filter pair corresponding with a direction to which a spatial audio signal is rendered based at least in part on the at least one signal quality parameter and the model so as to control spatial audio signal reproduction to take effect the change in the at least one of the position and orientation of the first head-mounted device during rendering of the spatial audio signal.

2. The apparatus of claim 1, wherein the filter pair is further configured to provide directionality and comprises a directional transfer function pair for the direction.

3. The apparatus of claim 2, wherein the directional transfer function pair is a head-related transfer function (HRTF) pair or the filter pair producing inter-aural level and/or time differences.

4. The apparatus of claim 1, wherein the first head-mounted device comprises a wireless headset and the first user device comprises a mobile device.

5. The apparatus of claim 1, wherein the at least one memory and the computer code are further configured to with the at least one processor to further cause the apparatus to:

store data comprising a plurality of head positions and orientations and corresponding wireless signals data, wherein wireless signals are received over a short-range wireless connection between one or more devices and at least one head-mounted device, wherein the stored data is used to further train the model using machine learning.

6. The apparatus of claim 5, wherein the model comprises signal quality measurements of the wireless signals from a set comprising: the wireless signals, received signal strength (RSS), bit error rate (BER), signal-to-noise ratio (SNR), and measureable features of electromagnetic waves.

7. The apparatus of claim 1, wherein the model is trained using a discriminative approach, and wherein the output of the model predicts a likelihood of the at least one of the position and orientation of the first head-mounted device in relation to the first user device given the at least one signal quality parameter between the first head-mounted device and the first user device.

8. The apparatus of claim 7, wherein the model is trained using the discriminative approach comprising at least one of Deep Neural Networks, Logistic Regression, Random Forests, or Extreme Gradient Boosting.

9. The apparatus of claim 1, wherein the at least one memory and the computer code are further configured to with the at least one processor to further cause the apparatus to:

receive, by a conducting component of the first head-mounted device at a distance from another conducting component of the first user device, an indication of a change of an electromagnetic field generated by the first head-mounted device; and
determine the change in the at least one of the position and orientation of the first head-mounted device that corresponds to the indication of the change of the electromagnetic field based at least in part on the model.

10. The apparatus of claim 9, wherein the at least one memory and the computer code are further configured to with the at least one processor to further cause the apparatus to:
record the determined change in the at least one of the position and orientation of the first head-mounted device and the corresponding indication of the change of the electromagnetic field;
record signal quality measurements associated with the determined change in the at least one of the position and orientation of the first head-mounted device; and
train the model using machine learning based at least in part on the signal quality measurements between the first head-mounted device and the first user device with respect to the change in the electromagnetic field.

11. A method comprising:
receiving at least one of position and orientation of a first head-mounted device in relation to a first user device, wherein the at least one of the position and orientation received is used to train a model using machine learning;
detecting input data indicative of a change in the at least one of the position and orientation of the first head-mounted device in relation to the first user device;
determining at least one signal quality parameter based on the input data, wherein the at least one signal quality parameter is measured between the first head-mounted device and the first user device; and
determining a filter pair corresponding with a direction to which a spatial audio signal is rendered based at least in part on the at least one signal quality parameter and the model so as to control spatial audio signal reproduction to take effect the change in the at least one of the position and orientation of the first head-mounted device during rendering of the spatial audio signal.

12. The method of claim 11, wherein the filter pair is further configured to provide directionality and comprises a directional transfer function pair for the direction.

13. The method of claim 12, wherein the directional transfer function pair is a head-related transfer function (HRTF) pair or the filter pair producing inter-aural level and/or time differences.

14. The method of claim 11, wherein the first head-mounted device comprises a wireless headset and the first user device comprises a mobile device.

15. The method of claim 11, further comprising:
storing data comprising a plurality of head positions and orientations and corresponding wireless signals data, wherein wireless signals are received over a short-range wireless connection between one or more devices and at least one head-mounted device, wherein the stored data is used to further train the model using machine learning.

16. The method of claim 15, wherein the model comprises signal quality measurements of the wireless signals from a set comprising: the wireless signals, received signal strength (RSS), bit error rate (BER), signal-to-noise ratio (SNR), and measureable features of electromagnetic waves.

17. The method of claim 11, wherein the model is trained using a discriminative approach, and wherein the output of the model predicts a likelihood of the at least one of the position and orientation of the first head-mounted device in relation to the first user device given the at least one signal quality parameter between the first head-mounted device and the first user device.

18. The method of claim 17, wherein the model is trained using the discriminative approach comprising at least one of Deep Neural Networks, Logistic Regression, Random Forests, or Extreme Gradient Boosting.

19. The method of claim 11, further comprising:
receiving, by a conducting component of the first head-mounted device at a distance from another conducting component of the first head-mounted device, an indication of a change of an electromagnetic field generated by the first head-mounted device; and
determining the change in the at least one of the position and orientation of the first head-mounted device that corresponds to the indication of the change of the electromagnetic field based at least in part on the model.

20. A computer program product comprising at least one non-transitory computer-readable storage medium having computer-executable program code portions stored therein, the computer-executable program code portions comprising program code instructions for:
receiving at least one of position and orientation of a first head-mounted device in relation to a first user device, wherein the at least one of the position and orientation received is used to train a model using machine learning;
detecting input data indicative of a change in the at least one of the position and orientation of the first head-mounted device in relation to the first user device;
determining at least one signal quality parameter based on the input data, wherein the at least one signal quality parameter is measured between the first head-mounted device and the first user device; and
determining a filter pair corresponding with a direction to which a spatial audio signal is rendered based at least in part on the at least one signal quality parameter and the model so as to control spatial audio signal reproduction to take effect the change in the at least one of the position and orientation of the first head-mounted device during rendering of the spatial audio signal.

* * * * *